(12) United States Patent
Kamiyoshihara et al.

(10) Patent No.: US 10,185,179 B2
(45) Date of Patent: Jan. 22, 2019

(54) LIGHT-EMITTING APPARATUS AND IMAGE DISPLAY APPARATUS HAVING FIXING MEMBERS IN PIXEL BOUNDARIES

(71) Applicant: CANON KABUSHIKI KAISHA, Tokyo (JP)

(72) Inventors: Masahiro Kamiyoshihara, Kamakura (JP); Takuma Kanno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/043,247

(22) Filed: Jul. 24, 2018

(65) Prior Publication Data

US 2018/0329259 A1  Nov. 15, 2018

Related U.S. Application Data

(63) Continuation of application No. 15/229,626, filed on Aug. 5, 2016, now Pat. No. 10,061,159.

(30) Foreign Application Priority Data

Aug. 11, 2015 (JP) .................................. 2015-158721
Jun. 14, 2016 (JP) .................................. 2016-117664

(51) Int. Cl.
*G09G 3/36* (2006.01)
*G02F 1/1335* (2006.01)

(52) U.S. Cl.
CPC .. *G02F 1/133608* (2013.01); *G02F 1/133603* (2013.01)

(58) Field of Classification Search
CPC ......... G02F 1/133603; G02F 1/133605; G02F 1/133608; F21V 17/10; F21V 5/04; G09G 2320/0646; G09G 2360/145
See application file for complete search history.

(56) References Cited

U.S. PATENT DOCUMENTS

| 8,425,070 B2* | 4/2013 | Shin .................. G02F 1/133605 349/58 |
| 9,392,672 B2* | 7/2016 | Kurita ................ H05B 37/0218 |
| 2007/0052662 A1* | 3/2007 | Kim .................. G02F 1/133605 345/102 |
| 2012/0120650 A1* | 5/2012 | Sadeh ........................ F21V 5/04 362/235 |

FOREIGN PATENT DOCUMENTS

JP  2009-140720  6/2009

* cited by examiner

*Primary Examiner* — Tracie Y Green
(74) *Attorney, Agent, or Firm* — Cowan, Liebowitz & Latman, P.C.

(57) ABSTRACT

A light-emitting apparatus according to the present invention includes: a board on which a plurality of light source units are provided; a partition member provided on the board and enclosing each of the light source units; and a fixing member arranged in a boundary portion between two or more light source units that are adjacent to each other and fixing the board and the partition member.

20 Claims, 12 Drawing Sheets

BOUNDARY PORTION

BOUNDARY PORTION

LIGHT-EMITTING SURFACE

LIGHT-EMITTING APPARATUS AND IMAGE DISPLAY APPARATUS HAVING FIXING MEMBERS IN PIXEL BOUNDARIES

CROSS-REFERENCE TO RELATED APPLICATIONS

This application is a continuation of application Ser. No. 15/229,626, filed Aug. 5, 2016 the entire disclosure of which is hereby incorporated by reference.

BACKGROUND OF THE INVENTION

Field of the Invention

The present invention relates to a light-emitting apparatus and an image display apparatus.

Description of the Related Art

While cold cathode fluorescent lamps (CCFLs) have been conventionally used as light sources of backlight apparatuses for liquid crystal display apparatuses, in recent years, more and more backlight apparatuses use light-emitting diodes (LEDs) as light sources. Since an LED is a point light source, in a case where an LED is used as a light source of a backlight apparatus, an occurrence of brightness unevenness or color unevenness in light emitted from the backlight apparatus must be suppressed by exercising ingenuity with respect to arrangement of LEDs, a diffusion structure of light, a reflection structure of light, and the like. In particular, with a backlight apparatus using LEDs of a plurality of colors such as red, green, and blue, since brightness unevenness or color unevenness in a striped pattern or a grid pattern is more likely to occur as compared to a backlight apparatus using white LEDs, ingenuity must be exercised with respect to arrangement of LEDs, a diffusion structure of light, a reflection structure of light, and the like.

In addition, there is a technique which, taking advantage of the fact that an LED is a point light source, individually controls emission brightness of LEDs in order to partially change emission brightness of a backlight apparatus and increase contrast of a display image (an image being displayed). Such control of emission brightness is generally referred to as local dimming control. In local dimming control, for each of a plurality of divided regions that constitute a region of a screen, a process is performed involving analyzing a brightness value of image data and controlling emission brightness of a corresponding light source unit based on a result of the brightness value analysis. Accordingly, contrast of a display image is improved.

As a structure for further enhancing contrast of a display image, a structure is proposed which uses a partition member that encloses each of a plurality of light source units corresponding to a plurality of divided regions. A partition member can also be described as "a member which separates each of a plurality of light source units from other light source units". Due to such a structure, a difference in BL brightness (emission brightness of a backlight apparatus) between divided regions that are adjacent to each other can be further increased and a contrast of a display image can be further enhanced. In addition, by using a partition member with a surface having high reflectance, a difference in BL brightness between divided regions that are adjacent to each other can be further increased and a contrast of a display image can be further enhanced.

However, since light advancing from one divided region to another divided region is blocked by the partition member, in a region where the partition member is provided and in a vicinity thereof, BL brightness drops to brightness that is lower than in other regions (occurrence of brightness unevenness). In addition, in a case where each light source unit has a plurality of light sources with wavelengths of light that differ from each other, color separation occurs and, accordingly, color unevenness occurs in which a BL color (an emission color of a backlight apparatus) in a region where the partition member is provided and in a vicinity thereof differs from a BL color in other region.

A method for solving these problems is disclosed in, for example, Japanese Patent Application Laid-open No. 2009-140720. The technique disclosed in Japanese Patent Application Laid-open No. 2009-140720 uses an optical member which imparts an optical change to incident light and a diffusing member which diffuses incident light. The optical member is provided at a position separated from a partition member and the diffusing member is provided on the partition member. Light emitted from each light source unit is diffused by the diffusing member and subsequently enters the optical member. Due to diffusion of the light emitted from each light source unit by the diffusing member, an occurrence of color separation and an occurrence of color unevenness can be reduced.

In addition, the technique disclosed in Japanese Patent Application Laid-open No. 2009-140720 uses a fixing member which fixes the partition member and the diffusing member. Furthermore, in the technique disclosed in Japanese Patent Application Laid-open No. 2009-140720, a supporting portion which supports the optical member is provided on the fixing member.

However, with the technique disclosed in Japanese Patent Application Laid-open No. 2009-140720, in a case where a soft member or a thin sheet-like member is used as the partition member, an optical structure (emission characteristics) of the backlight apparatus changes due to a weight of the diffusing member, a weight of the partition member, and the like. For example, the optical structure of the backlight apparatus changes due to an occurrence of distortion of the partition member or an occurrence of a gap (flotation) between a substrate on which the light source units and the partition member are provided and the partition member. As a result, an increase in brightness unevenness or color unevenness in light emitted from the backlight apparatus, unexpected light leakage, operational failures of various controls, image quality deterioration of a display image, and the like occur.

SUMMARY OF THE INVENTION

The present invention provides a technique that enables a change in emission characteristics of a light-emitting apparatus (a light-emitting unit) to be suppressed.

A light-emitting apparatus according to the present invention comprises:

a board on which a plurality of light source units are provided;

a partition member provided on the board and enclosing each of the light source units; and a fixing member arranged in a boundary portion between two or more light source units that are adjacent to each other and fixing the board and the partition member.

An image display apparatus according to the present invention comprises:

a light-emitting unit; and a display unit configured to display an image by modulating light emitted from the light-emitting unit, wherein the light-emitting unit includes:

a board on which a plurality of light source units are provided;

a partition member provided on the board and enclosing each light source unit; and a fixing member arranged in a boundary portion between two or more light source units that are adjacent to each other and fixing the board and the partition member.

According to the present invention, a change in emission characteristics of a light-emitting apparatus (a light-emitting unit) can be suppressed.

Further features of the present invention will become apparent from the following description of exemplary embodiments with reference to the attached drawings.

DESCRIPTION OF THE EMBODIMENTS

First Embodiment

Hereinafter, a light-emitting apparatus according to a first embodiment of the present invention will be described. The light-emitting apparatus according to the present embodiment is a light-emitting apparatus which enables local dimming control. The light-emitting apparatus according to the present embodiment can be used as, for example, a backlight apparatus for a transmission liquid crystal display apparatus. Moreover, the light-emitting apparatus according to the present embodiment is not limited to a backlight apparatus. The light-emitting apparatus according to the present embodiment can be used in any image display apparatus as long as the image display apparatus displays an image by modulating light from the light-emitting apparatus. For example, the light-emitting apparatus according to the present embodiment can even be used in a reflection liquid crystal display apparatus. The light-emitting apparatus according to the present embodiment can also be used in a micro electro mechanical system (MEMS) shutter system display apparatus which uses a MEMS shutter instead of liquid crystal elements. The light-emitting apparatus according to the present embodiment can also be used in image display apparatuses such as an advertisement display apparatus and a sign display apparatus. The light-emitting apparatus according to the present embodiment can also be used as an illumination apparatus of a street lamp, an indoor lighting fixture, a microscope light or the like.

Figure 1:
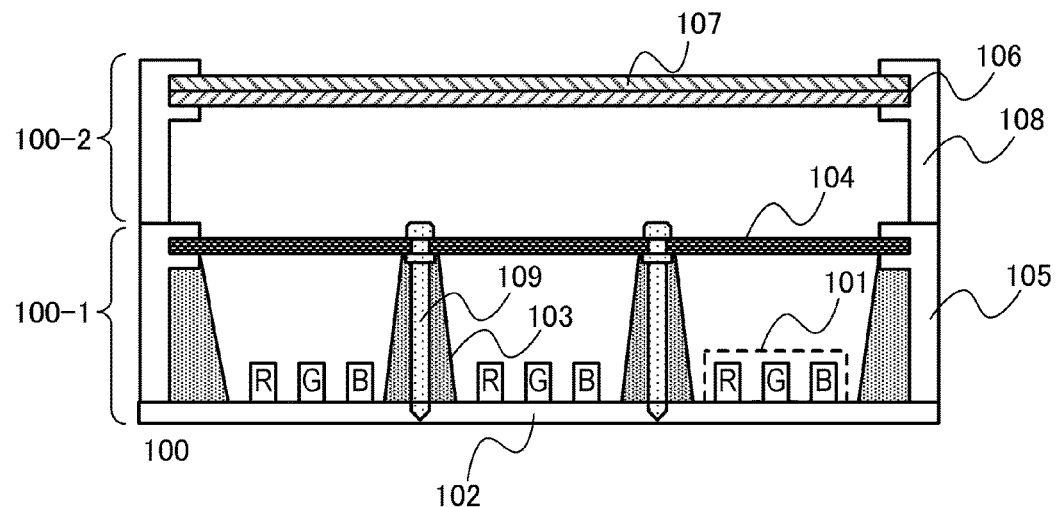
FIG. 1 is a sectional view showing an example of a configuration of an image display apparatus according to a first embodiment.

FIG. 1 is a sectional view showing an example of a configuration of an image display apparatus 100 according to the present embodiment. FIG. 1 is a sectional view taken along a plane perpendicular to a screen (a light-emitting surface of a light-emitting unit (a light-emitting apparatus)). As shown in FIG. 1, the image display apparatus 100 includes a light-emitting unit 100-1 and a display unit 100-2. The display unit 100-2 displays an image on a screen by transmitting light emitted from the light-emitting unit 100-1. The light-emitting unit 100-1 includes a plurality of light source units 101, a board 102, a partition member 103, a first optical member 104, a first holding member 105, and a fixing member 109. The display unit 100-2 includes a second optical member 106, a liquid crystal panel 107, and a second holding member 108. Moreover, the liquid crystal panel 107 may be perceived as the display unit 100-2. In addition, at least one of the second optical member 106 and the second holding member 108 may be perceived as a member of the light-emitting unit 100-1.

For example, the board 102 includes a circuit substrate on which a circuit is formed, a heat-dissipating substrate which releases heat of the image display apparatus 100 or the light-emitting unit 100-1 to the outside, and a thermally conductive sheet which electrically insulates the circuit substrate from the heat-dissipating substrate. For example, a circuit which supplies each light source unit 101 with a drive signal for driving each light source unit 101 is formed on the circuit substrate. For example, a metallic substrate is used as the heat-dissipating substrate. The thermally conductive sheet is sandwiched between the circuit substrate and the heat-dissipating substrate.

Figure 2:
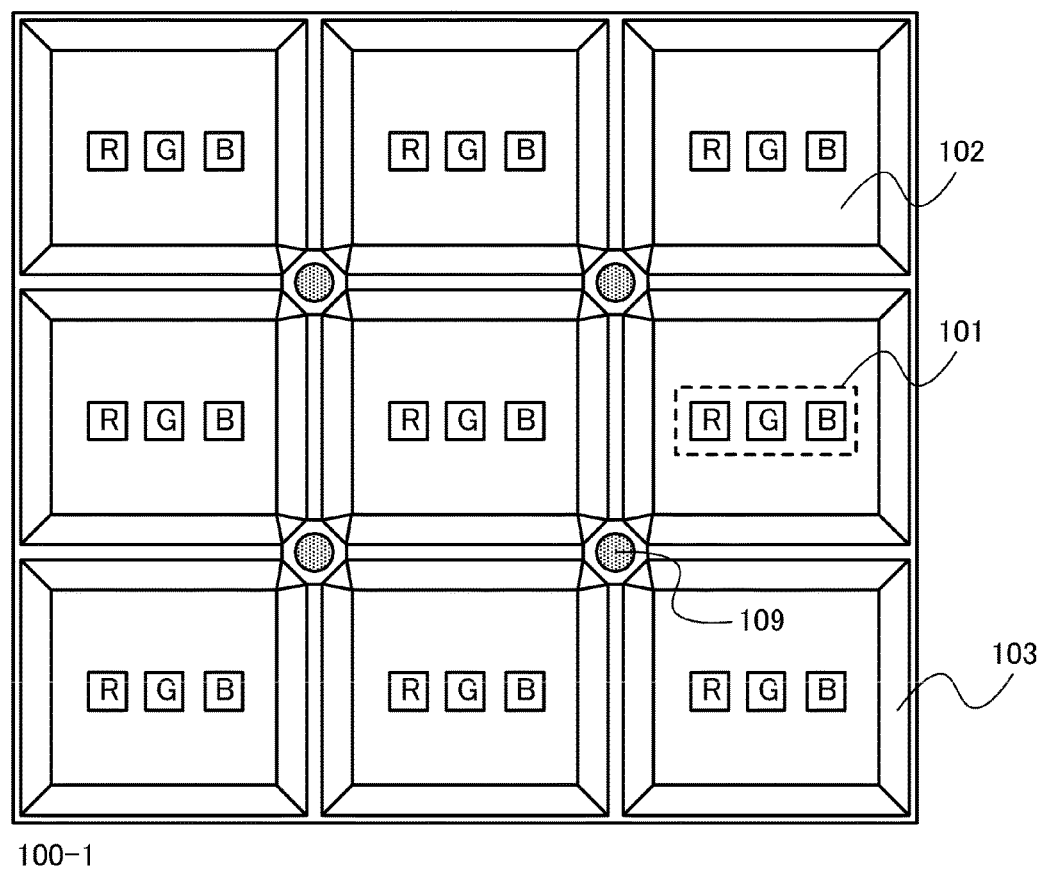
FIG. 2 is a top view showing an example of a configuration of a light-emitting unit according to the first embodiment.

The plurality of light source units 101 are provided on the board 102. FIG. 2 is a top view of the light-emitting unit 100-1 as seen from a side of the light-emitting surface. In FIG. 2, the first optical member 104 and the first holding member 105 have been omitted. In the present embodiment, the plurality of light source units 101 are arranged in a matrix pattern having N rows and M columns (where N and M are, respectively, integers equal to or larger than 2). Specifically, as shown in FIG. 2, nine light source units 101 in three rows and three columns are provided on the board 102. A screen region is associated with each light source unit. For example, nine divided regions in three rows and three columns which constitute a screen region are determined in advance and the nine light source units 101 are respectively associated with the nine divided regions. Moreover, the number and arrangement of the light source units 101 are not particularly limited. For example, there may be more or less than nine light source units 101. The plurality of light source units 101 may be arranged in a staggered pattern.

Each light source unit 101 has a plurality of light sources. For example, each light source unit 101 has two or more types of light source with light wavelengths (colors) that differ from each other. As shown in FIGS. 1 and 2, in the present embodiment, each light source unit 101 has three light sources—an R light source, a G light source, and a B light source—which are arranged in one direction. The R light source (the light source denoted by "R" in FIGS. 1 and 2) emits red light. The G light source (the light source denoted by "G" in FIGS. 1 and 2) emits green light. In addition, the B light source (the light source denoted by "B" in FIGS. 1 and 2) emits blue light. As the light sources, a light-emitting diode (LED), an organic EL element, a laser element, a cold cathode tube, or the like can be used. Moreover, the number, the type, and an arrangement of the light sources are not particularly limited. For example, each light source unit 101 may include more or less than three light sources. Each light source unit 101 may include one light source. Each light source unit 101 may include a plurality of light sources arranged in a matrix pattern. Each light source unit 101 may include a plurality of light sources of a same type.

The partition member 103 is provided on the board 102. While a material of the partition member 103, a shape of the partition member 103, and the like are not particularly limited, for example, a PET (polyethylene terephthalate) sheet, a PC (polycarbonate) sheet, or the like is used as the partition member 103. The partition member 103 has a shape which encloses each light source unit 101 on a plane parallel to the screen. A plane parallel to the screen can also be described as "a plane parallel to the light-emitting surface", "a plane parallel to the board 102", and the like. The partition member 103 can also be described as "a member which separates each of the plurality of light source units 101 from other light source units 101". Light advancing from one light source unit 101 to an adjacent light source unit 101 is blocked by the partition member 103. Accordingly, during local dimming control in which emission brightness of each light source unit 101 is individually controlled, a difference in brightness of the light-emitting surface (emission brightness of the light-emitting unit 100-1) between divided regions that are adjacent to each other can be further increased and a contrast of a display image can be further enhanced. In addition, by using a member with a surface having high reflectance as the partition member 103, light advancing from one light source unit 101 to an adjacent light source unit 101 can be efficiently reflected by the partition member 103 toward a side of the light-emitting surface. As a result, during local dimming control, a difference in brightness of the light-emitting surface between divided regions that are adjacent to each other can be further increased and a contrast of a display image can be further enhanced.

Moreover, in a case where the light-emitting apparatus (the light-emitting unit 100-1) according to the present embodiment is a light-emitting apparatus for an image display apparatus, a size and an arrangement of the partition member 103 are favorably determined so that a screen region (a display region) is enclosed by an outline of the partition member 103 on a plane parallel to the screen.

The first optical member 104 imparts an optical change to incident light having entered the first optical member 104 in a case where the incident light is transmitted through the first optical member 104. For example, light from each light source unit 101 enters the first optical member 104. The first optical member 104 includes at least a diffusing member (a diffusing plate, a diffusing sheet, or the like) which diffuses incident light. The first optical member 104 is provided on the partition member 103. While a shape of the first optical member 104 is not particularly limited, in the present embodiment, a plate-like member is used as the first optical member 104.

Moreover, the first optical member 104 may further include at least one of a condensing member (a condensing plate, a condensing sheet, or the like) and a polarizing member (a polarizing plate, a polarizing sheet, or the like). The first optical member 104 may include an optical member other than a condensing member and a polarizing member. The condensing member condenses incident light having entered at various angles of incidence in a light-emitting direction of the light-emitting unit 100-1. The polarizing member polarizes incident light. The light-emitting direction of the light-emitting unit 100-1 is a direction perpendicular to the light-emitting surface and is a direction oriented from the light-emitting unit 100-1 toward the display unit 100-2. Since a screen-side surface is a front of the image display apparatus 100, the light-emitting direction of the light-emitting unit 100-1 can also be described as "a front direction".

The first holding member 105 is a supporting member which holds an edge portion of the partition member 103 and an edge portion of the first optical member 104.

The fixing member 109 fixes the board 102, the partition member 103, and the first optical member 104. The fixing member 109 can also be described as "a member which suppresses degrees of freedom of the partition member 103 and the first optical member 104 with respect to the board 102". In the present embodiment, as shown in FIG. 2, the fixing member 109 is provided in a central portion of four light source units that are adjacent to each other and which are arranged in two rows and two columns. Details of a fixing method used by the fixing member 109 will be provided later.

Moreover, a material of the fixing member 109 is not particularly limited. For example, as the fixing member 109, a resin member may be used or a metallic member may be used. In addition, while the fixing member 109 is provided in all of the central portions described earlier in FIG. 2, the fixing member 109 may be provided in a part of the central portions. Furthermore, optical sensors may be provided in a part of the central portions where the fixing member 109 is not provided. For example, an optical sensor is used for detecting light emitted from each light source unit. As the optical sensor, a brightness sensor which detects brightness of light, a color sensor which detects a color of light, a sensor which detects both the brightness and the color of light, and the like can be used. Moreover, while also dependent on strength of the partition member 103 and the like, one fixing member 109 may be provided with respect to light source units arranged in nine rows and nine columns.

The second optical member 106 imparts an optical change to incident light having entered the second optical member 106 in a case where the incident light is transmitted through the second optical member 106. For example, light emitted from each light source unit 101 and transmitted through the first optical member 104 enters the second optical member 106. In addition, light emitted from each light source unit 101 and transmitted through the first optical member 104 and the second optical member 106 enters the liquid crystal panel 107. The second optical member 106 is provided on a side of the front direction with respect to the partition member 103 so as to be separated from the partition member 103. While a shape of the second optical member 106 is not particularly limited, in the present embodiment, a plate-like member is used as the second optical member 106. For example, the second optical member 106 includes at least one of a diffusing member (a diffusing plate, a diffusing sheet, or the like), a condensing member (a condensing plate, a condensing sheet, or the like) and a polarizing member (a polarizing plate, a polarizing sheet, or the like). Moreover, the second optical member 106 may include an optical member other than a diffusing member, a condensing member, and a polarizing member.

In the present embodiment, an optical change is imparted by the first optical member 104 and the second optical member 106 to light emitted from a plurality of light source units 101. For example, light emitted from a plurality of light source units 101 is diffused by the first optical member 104 and the second optical member 106. Accordingly, brightness unevenness and color unevenness of light incident to the liquid crystal panel 107 can be reduced. Generally, assuming that a position of the second optical member 106 is constant, the closer the first optical member 104 is to the board 102 (the plurality of light source units 101), the greater the reduction in brightness unevenness and color unevenness. In addition, assuming that the position of the second optical member 106 is constant, the closer the first optical member 104 is to the second optical member 106, the higher the value of increased contrast of a display image.

The liquid crystal panel 107 displays an image on a screen by transmitting light incident to the liquid crystal panel 107. The liquid crystal panel 107 includes a plurality of liquid crystal elements. Transmittance of each liquid crystal element is controlled based on image data output from an image output apparatus (not illustrated). The image is displayed on the screen as light incident to the liquid crystal panel 107 is transmitted through each liquid crystal element at transmittance based on the image data.

The second holding member 108 is a supporting member which holds an edge portion of the second optical member 106 and an edge portion of the liquid crystal panel 107. Due to the second holding member 108, a distance (interval) between the second optical member 106 and the liquid crystal panel 107 is kept at a constant distance.

Figure 3:
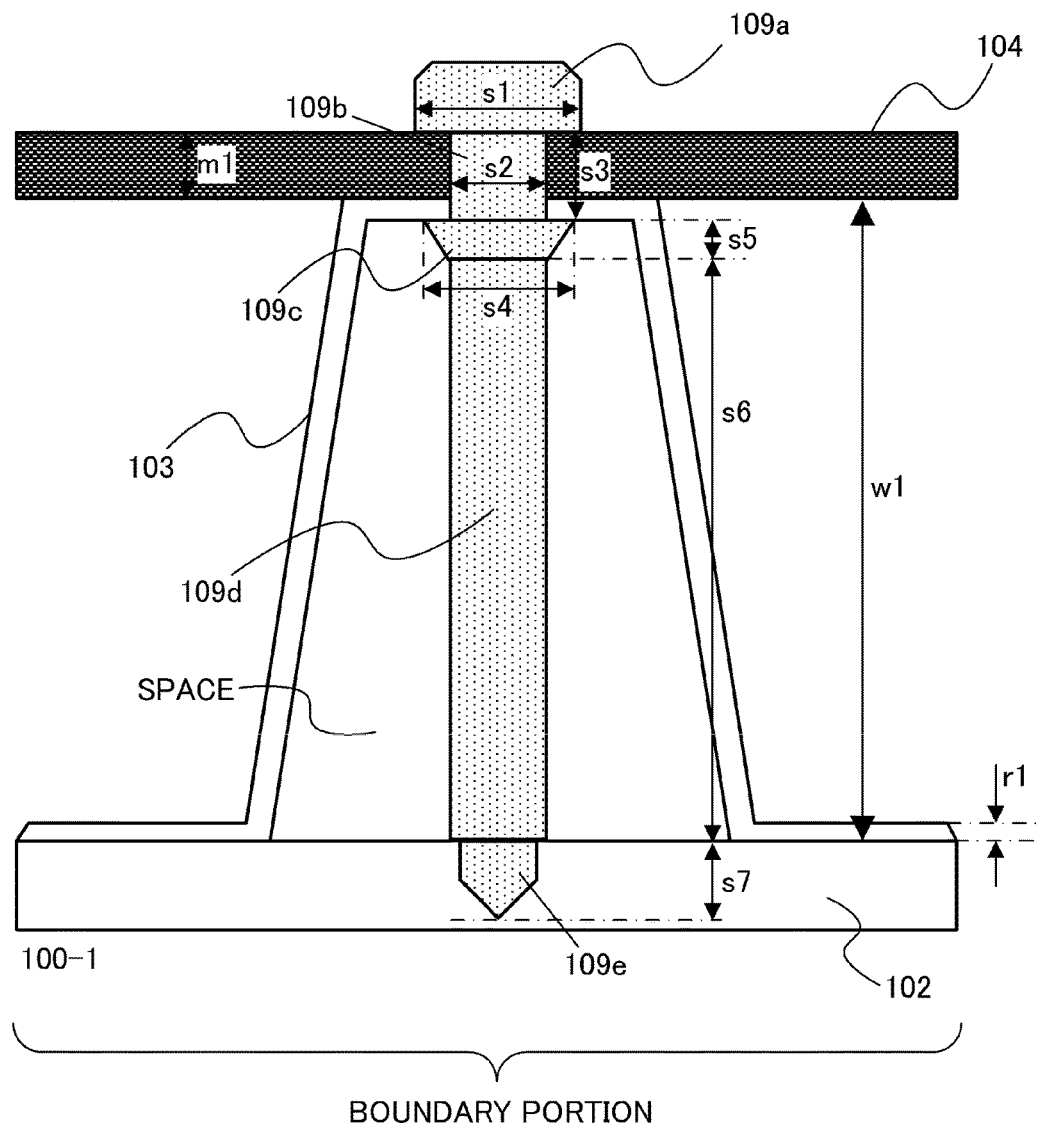
FIG. 3 is a sectional view showing an example of a configuration of a light-emitting unit according to the first embodiment.
Figure 4:
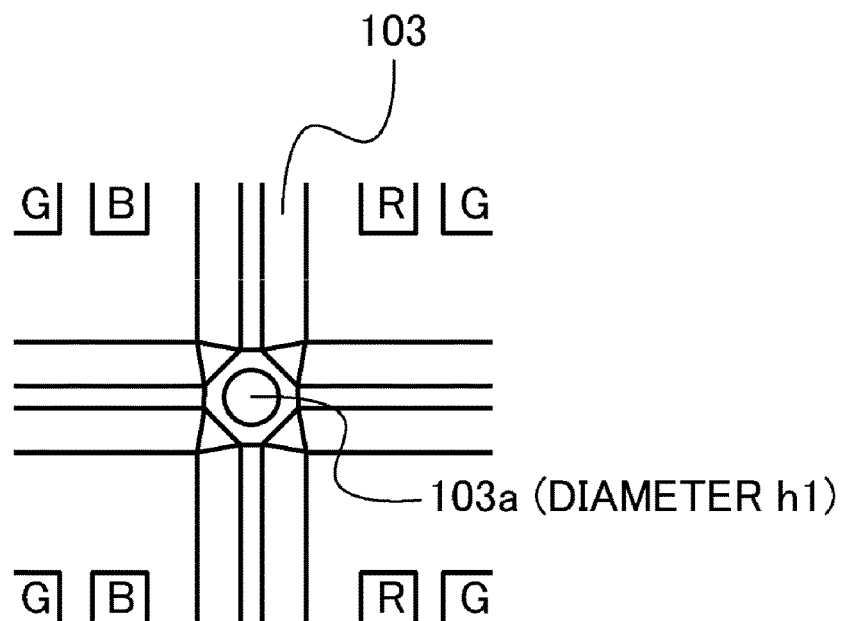
FIG. 4 is a top view showing an example of a configuration of a partition member according to the first embodiment.
Figure 5:
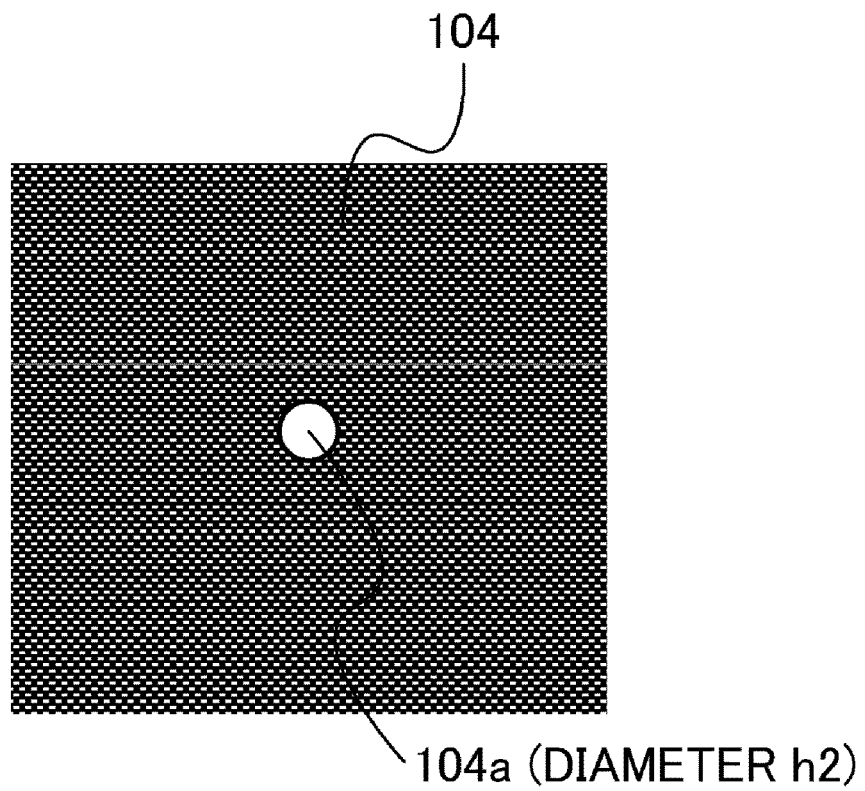
FIG. 5 is a top view showing an example of a configuration of a first optical member according to the first embodiment.

Next, a specific example of a fixing method used by the fixing member 109 will be described with reference to FIGS. 3 to 5. FIG. 3 is a sectional view of the light-emitting unit 100-1 at a position where the fixing member 109 is to be provided. FIG. 4 is a top view of the partition member 103 at a position where the fixing member 109 is to be provided. FIG. 5 is a top view of the first optical member 104 at a position where the fixing member 109 is to be provided.

In the present embodiment, as shown in FIG. 3, a sheet-like member is used as the partition member 103. A thickness of the partition member 103 is, for example, around 0.1 to 2 mm (the thickness of the partition member 103 is not limited to this example). In addition, as shown in FIG. 3, a space is formed by the partition member 103 and the board 102 at a boundary portion between the plurality of light source units 101. Furthermore, as shown in FIG. 3, the fixing member 109 is provided in this space.

While a shape of the fixing member 109 is not particularly limited, in the present embodiment, a rod-like member is used as the fixing member 109. In addition, in the present embodiment, a first fixing portion to be fixed to the board 102 is provided atone end of the fixing member 109. Specifically, as shown in FIG. 3, a male screw 109e (a fourth screw portion) with a length of s7 is formed as the first fixing portion at one end of the fixing member 109. Furthermore, a female screw (a third screw portion) with a depth of s7 is formed in the board 102 at a position where the fixing member 109 is to be provided. The male screw 109e of the fixing member 109 is screwed into the female screw of the board 102. Accordingly, the fixing member 109 is fixed to the board 102.

Moreover, the depth of the female screw of the board 102 need only be greater than s7. In addition, although an example in which the third screw portion is a female screw and the fourth screw portion is a male screw has been described in the present embodiment, the third screw portion may be a male screw and the fourth screw portion may be a female screw.

Moreover, the method of fixing the fixing member 109 to the board 102 is not particularly limited. For example, a convexed portion may be formed as the first fixing portion. In addition, an opening into which the convexed portion can be inserted may be formed on the board 102. Treatment for suppressing detachment of the convexed portion from the opening may be performed on a protruding portion of the convexed portion (a portion protruding from the board 102 (the opening)) in a case where the convexed portion is inserted into the opening. Accordingly, the fixing member 109 can be fixed to the board 102. The treatment for suppressing detachment of the convexed portion from the opening is treatment in which a member larger than the opening is fixed to the protruding portion, treatment in which the protruding portion is deformed to a size that is larger than the opening, or the like. The fixing member 109 may be fixed to the board 102 using an adhesive. The fixing member 109 may be fixed to the board 102 using a rivet. The fixing member 109 may be welded to the board 102 using a rivet bit or the like.

In the present embodiment, a second fixing portion to be fixed to the partition member 103 and the first optical member 104 is provided at another end of the fixing member 109. In the present embodiment, as shown in FIG. 4, an opening 103a is formed on the partition member 103 at a position where the fixing member 109 is to be provided. Specifically, the partition member 103 has a planar portion that is parallel to the screen at a position where the fixing member 109 is to be provided, and the opening 103a is formed in this planar portion. In addition, as shown in FIG. 5, an opening 104a is also formed on the first optical member 104 at a position where the fixing member 109 is to be provided. Furthermore, as shown in FIG. 3, the second fixing portion passes through the opening 103a of the partition member 103 and the opening 104a of the first optical member 104 and holds the partition member 103 and the first optical member 104. In FIG. 3, the second fixing portion includes an upper head portion 109a, a passing portion 109b, and a lower head portion 109c. The upper head portion 109a is a portion which presses the first optical member 104 from a downstream side in the light-emitting direction with respect to the first optical member 104. The passing portion 109b is a portion which passes through the openings 103a and 104a. The lower head portion 109c is a portion which presses the partition member 103 from an upstream side in the light-emitting direction with respect to the partition member 103.

A diameter h1 of the opening 103a, a diameter h2 of the opening 104a, and a diameter s2 of the passing portion 109b satisfy a relationship expressed by Expression 1 below. Moreover, as long as the passing portion 109b can be passed through the openings 103a and 104a, a shape of the opening 103a, a size of the opening 103a, a shape of the opening 104a, a size of the opening 104a, a shape of the passing portion 109b, and a size of the passing portion 109b are not particularly limited.

$$s2 < h1 \cong h2 \qquad \text{(Expression 1)}$$

In addition, a width s1 of the upper head portion 109a is larger than the diameter h2 of the opening 104a and a width s4 of the lower head portion 109c is larger than the diameter h1 of the opening 103a. Furthermore, a distance s3 from a lower end (an upstream-side end in the light-emitting direction) of the upper head portion 109a to an upper end (a downstream-side end in the light-emitting direction) of the lower head portion 109c, a thickness r1 of the partition member 103, and a thickness m1 of the first optical member 104 satisfy a relationship expressed by Expression 2 below. This relationship enables the fixing member 109 to be also fixed to the partition member 103 and the first optical member 104. As a result, degrees of freedom of the partition member 103 and the first optical member 104 with respect to the board 102 can be suppressed.

$$s3 = r1 + m1 \qquad \text{(Expression 2)}$$

In addition, in the example shown in FIG. 3, a height w1 of the partition member 103, a thickness s5 of the lower head portion 109c, a length s6 of an intermediate portion 109d of the fixing member 109, and the thickness r1 of the partition member 103 satisfy a relationship expressed by Expression 3 below.

$$w1 = s5 + s6 + r1 \qquad \text{(Expression 3)}$$

Moreover, the method of fixing the fixing member 109 to the partition member 103 and the first optical member 104 is not particularly limited. For example, the fixing member 109 may be fixed to the partition member 103 and the first optical member 104 using a screw. The fixing member 109 may be fixed to the partition member 103 and the first optical member 104 using an adhesive. The fixing member 109 may be fixed to the partition member 103 and the first optical member 104 using a rivet. The fixing member 109 may be welded to the partition member 103 and the first optical member 104 using a rivet bit or the like.

As described above, according to the present embodiment, the board 102, the partition member 103, and the first optical member 104 are fixed by the fixing member 109. Accordingly, deformation of the partition member 103 attributable to a force (pressure or the like) applied to the partition member 103 from the first optical member 104 can be suppressed. In addition, deformation of the partition member 103 attributable to other forces and impact applied to the partition member 103 can be suppressed. As a result, a change in emission characteristics of the light-emitting apparatus (the light-emitting unit 100-1) can be suppressed. By extension, an increase in brightness unevenness or color unevenness in light emitted from the light-emitting apparatus, an occurrence of unexpected light leakage, occurrences of operational failures of various controls, and the like can be suppressed. Furthermore, in a case where the light-emitting apparatus is used in an image display apparatus, by suppressing a change in emission characteristics, image quality deterioration of a display image can be suppressed.

Figure 11A:
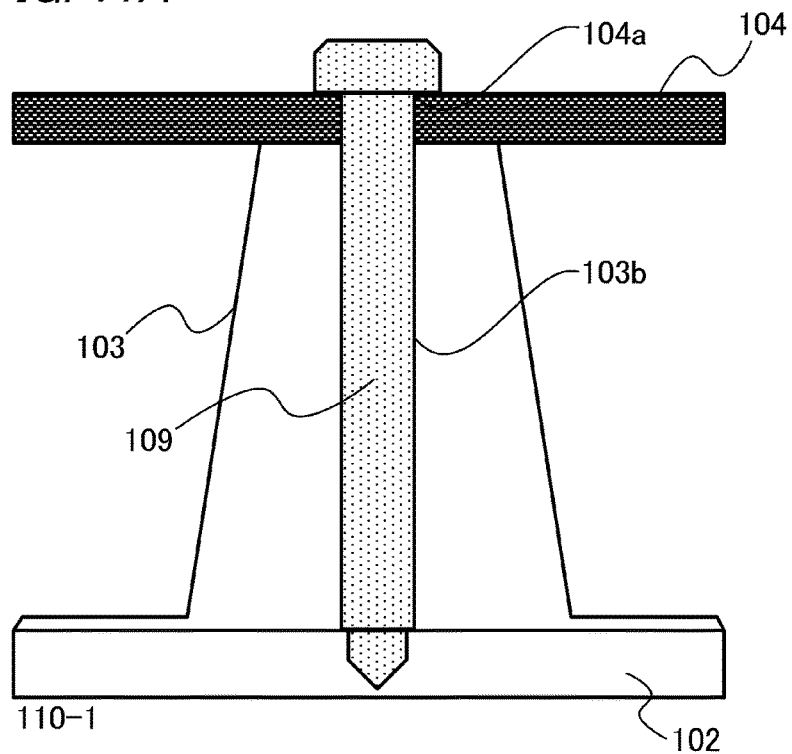
FIGS. 11A and 11B are sectional views showing an example of a configuration of a light-emitting unit according to the first embodiment.
Figure 11B:
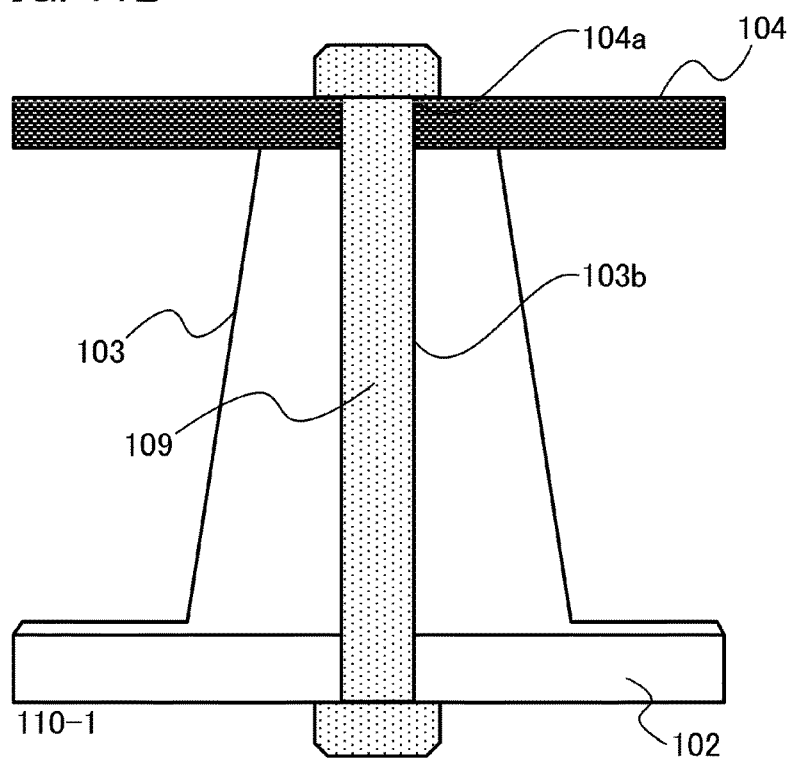

Moreover, a structure of the partition member 103 is not particularly limited. For example, as shown in FIGS. 11A and 11B, a space may not be formed by the partition member 103 and the board 102. In addition, the method of fixing used by the fixing member 109 is not particularly limited. For example, as shown in FIG. 11A, the fixing member 109 may be fixed to the board 102 through openings of the partition member 103 and the first optical member 104. Specifically, the fixing member 109 may be fixed to the board 102 through a through-hole 103b formed in the partition member 103 and the opening 104a formed on the first optical member 104. The "through-hole 103b into which the fixing member 109 is inserted" can also be described as a "space formed by the partition member 103 and the board 102". In the example shown in FIG. 11A, the partition member 103 and the first optical member 104 are sandwiched by the fixing member 109 and the board 102. Such a structure can be applied in a case where, for example, the partition member 103 requires the use of a material with high thermal conductivity for the purpose of heat dissipation of the light source unit 101. In addition, such a structure can also be applied in a case where the partition member 103 requires the use of a material with high shielding performance as a countermeasure implemented by the light source unit 101 against electromagnetic waves that affect the liquid crystal panel 107. As described above, the structure shown in FIG. 11A is effective in terms of suppressing distortion of the partition member 103 in a case where the partition member 103 is made of an elastic material or in a case where the partition member 103 is made of a soft material such as a foamable material. Furthermore, as shown in FIG. 11B, the board 102, the partition member 103, and the first optical member 104 may be fixed by having the fixing member 109 hold the board 102, the partition member 103, and the first optical member 104.

Figure 12A:
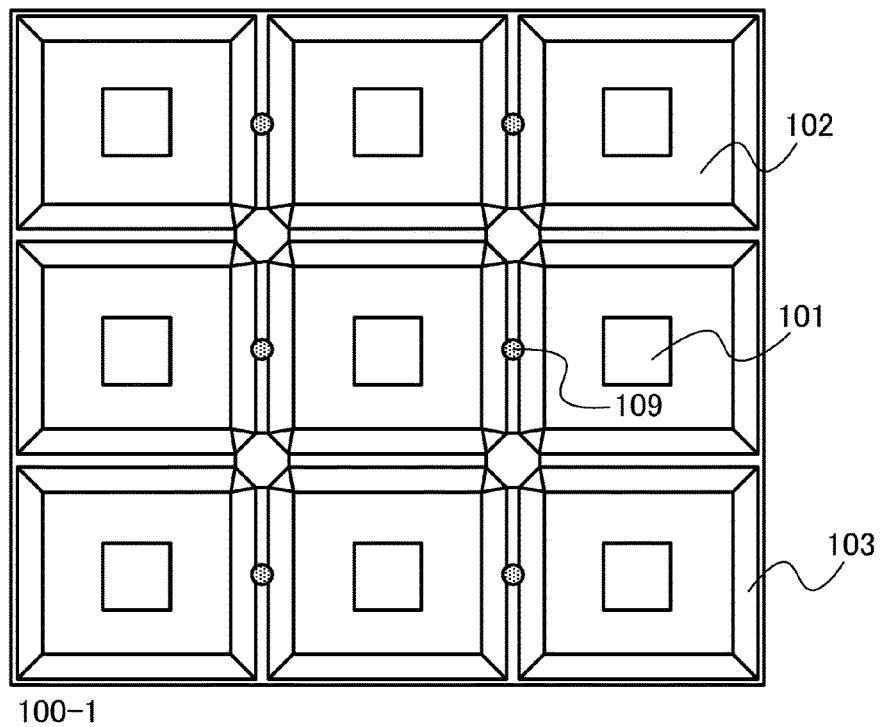
FIGS. 12A and 12B are top views showing an example of a configuration of a light-emitting unit according to the first embodiment.
Figure 12B:
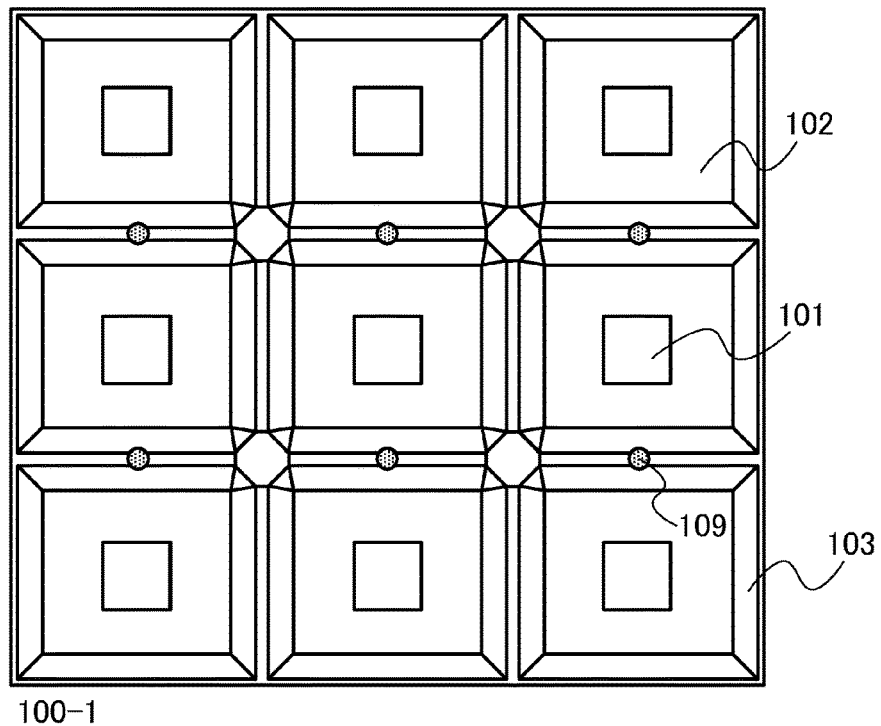

Moreover, a position of the fixing member 109 is not particularly limited. For example, as shown in FIG. 12A, the fixing member 109 may be provided in a boundary portion between two light source units 101 which are arranged side by side in a row direction and which are adjacent to each other. As shown in FIG. 12B, the fixing member 109 may be provided in a boundary portion between two light source units 101 which are arranged side by side in a column direction and which are adjacent to each other.

Second Embodiment

Hereinafter, a light-emitting apparatus according to a second embodiment of the present invention will be described. In the first embodiment, an example in which a fixing member is constituted by a single member has been described. In the present embodiment, an example in which a fixing member is constituted by a plurality of members will be described. Moreover, same members as in the first embodiment will be assigned same reference characters as the first embodiment and descriptions thereof will be omitted.

Figure 6:
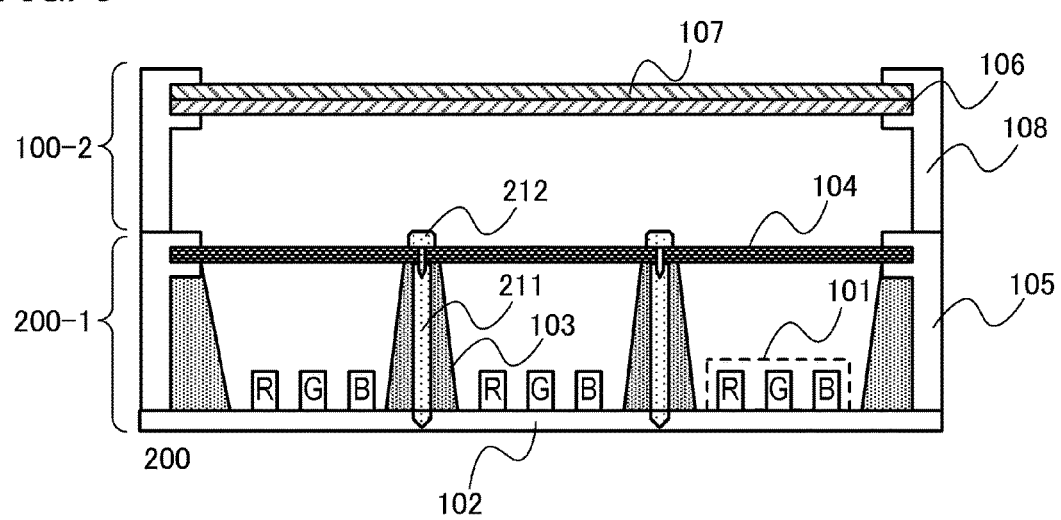
FIG. 6 is a sectional view showing an example of a configuration of an image display apparatus according to a second embodiment.

FIG. 6 is a sectional view showing an example of a configuration of an image display apparatus 200 according to the present embodiment. As shown in FIG. 6, in the present embodiment, a fixing member includes a first member 211 and a second member 212.

Figure 7:
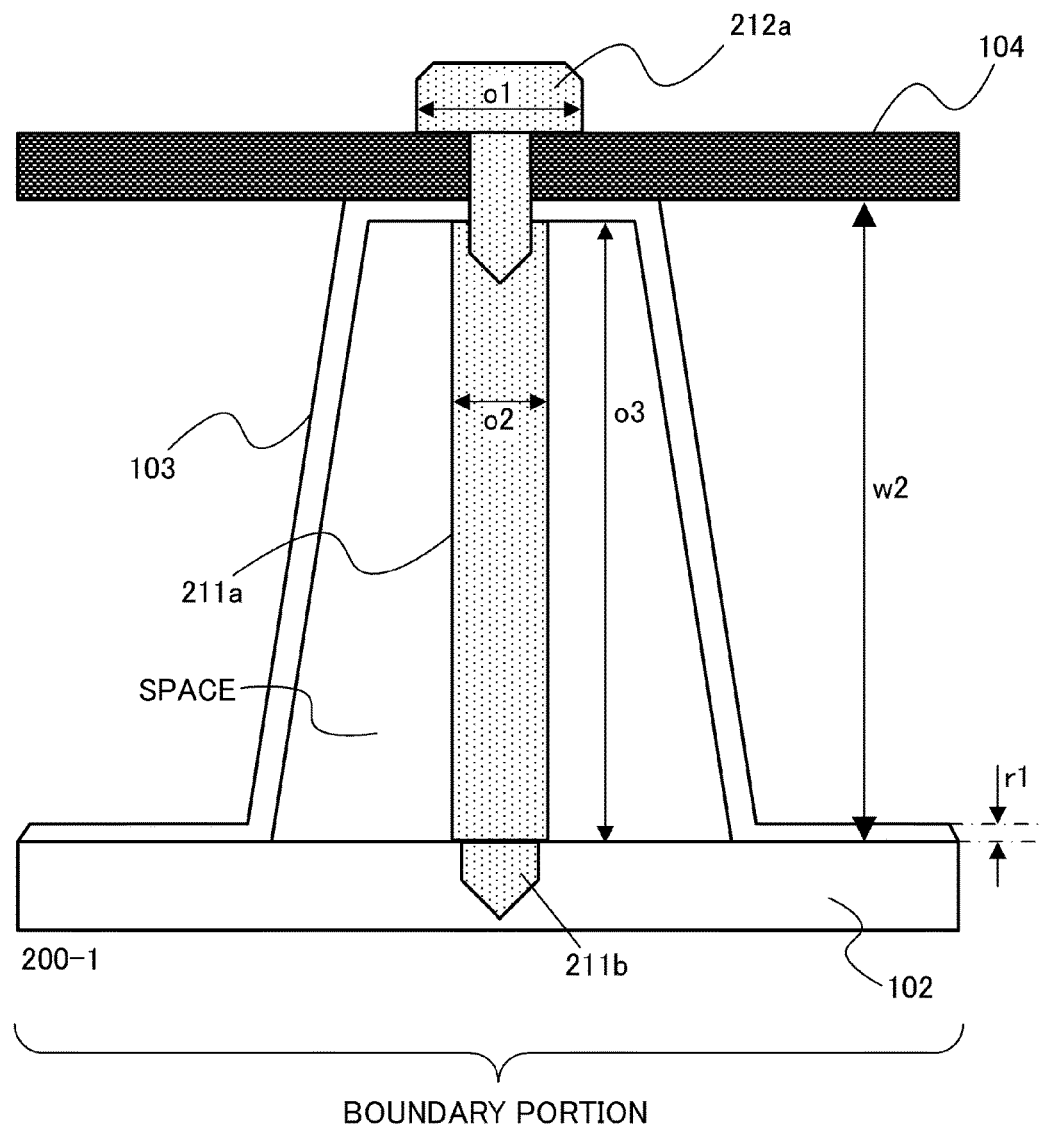
FIG. 7 is a sectional view showing an example of a configuration of a light-emitting unit according to the second embodiment.

FIG. 7 is a sectional view of a light-emitting unit 200-1 at a position where the fixing member is to be provided. In the present embodiment, as shown in FIG. 7, a male screw 211b (a fourth screw portion) is formed as a first fixing portion at one end of the first member 211. In addition, a female screw (a third screw portion) is formed in the board 102 at a position where the fixing member is to be provided. The male screw 211b of the first member 211 is screwed into the female screw of the board 102. Accordingly, the fixing member is fixed to the board 102.

Moreover, the method of fixing the fixing member to the board 102 is not particularly limited. For example, the fixing member may include a third member. An opening may be formed in the board 102 at a position where the fixing member is to be provided. In addition, the board 102 may be sandwiched by the first member 211 and the third member through the opening of the board 102. As a method of sandwiching the board 102 with the first member 211 and the third member, a method using a screw, a method using a pin, a method using a rivet, or the like can be used.

In the example shown in FIG. 7, a length o3 of a spacer portion 211a of the first member 211, a distance w2 from an upper end of the board 102 to a lower end of the first optical member 104, and the thickness r1 of the partition member 103 satisfy a relationship expressed by Expression 4 below. The spacer portion 211a is a portion excluding the male screw 211b from the first member 211.

$$o3 = w2 - r1 \quad \text{(Expression 4)}$$

In addition, in the present embodiment, as shown in FIG. 7, a female screw (a first screw portion) is formed at another end of the first member 211. A male screw (a second screw portion) which is to be screwed into the female screw of the first member 211 is formed on the second member 212. In addition, in a similar manner to the first embodiment, openings are formed in the partition member 103 and the first optical member 104 at positions where the fixing member is to be provided. Furthermore, as shown in FIG. 7, the partition member 103 and the first optical member 104 are sandwiched as the male screw of the second member 212 is screwed into the female screw of the first member 211 through the openings of the partition member 103 and the first optical member 104.

As shown in FIG. 7, a width (a diameter) o2 of the first member 211 is larger than a diameter of the opening formed in the partition member 103 and a width o1 of a head portion 212a of the second member 212 is larger than a diameter of the opening formed in the first optical member 104. This relationship enables the partition member 103 and the first optical member 104 to be sandwiched by the first member 211 and the second member 212. In other words, the fixing member can also be fixed to the partition member 103 and the first optical member 104. As a result, degrees of freedom of the partition member 103 and the first optical member 104 with respect to the board 102 can be suppressed.

Moreover, although an example in which the first screw portion is a female screw and the second screw portion is a male screw has been described in the present embodiment, the first screw portion may be a male screw and the second screw portion may be a female screw. In addition, the method of fixing the fixing member 109 to the partition member 103 and the first optical member 104 is not particularly limited. For example, the first member 211 and the second member 212 may be joined using a pin. The first member 211 and the second member 212 may be joined using a rivet.

As described above, according to the present embodiment, the board 102, the partition member 103, and the first optical member 104 are fixed by the fixing member. Accordingly, a change in emission characteristics of the light-emitting apparatus (the light-emitting unit 200-1) can be suppressed. In addition, according to the present embodiment, the fixing member is constituted by a plurality of members. Accordingly, a reduction in manufacturing cost of the light-emitting apparatus can be achieved. For example, in the first embodiment, since the shape of the fixing member is complex, a custom-made item must be prepared as the fixing member. On the other hand, in the present embodiment, the fixing member may be realized by combining commercially available items. For example, a commercially available spacer can be used as the first member 211 and a commercially available screw, pin, rivet, or the like can be used as the second member 212. The use of commercially available items enables manufacturing cost of the light-emitting apparatus to be reduced. In addition, by configuring the fixing member using a plurality of members, assembly and disassembly of the light-emitting apparatus can be readily performed.

Third Embodiment

Hereinafter, a light-emitting apparatus according to a third embodiment of the present invention will be described. In the present embodiment, a configuration that enables a further reduction in brightness unevenness or color unevenness of light emitted from a light-emitting apparatus will be described. In a case where the light-emitting apparatus is used in an image display apparatus, by reducing brightness unevenness or color unevenness of light emitted from the light-emitting apparatus, image quality of a display image is improved. Moreover, while an example in which a characteristic configuration of the present embodiment is combined with the configuration of the second embodiment will be described in the present embodiment, the characteristic configuration of the present embodiment may also be combined with the configuration of the first embodiment. In addition, same members as in the first and second embodiments will be assigned same reference characters as the first embodiment and descriptions thereof will be omitted.

Figure 8:
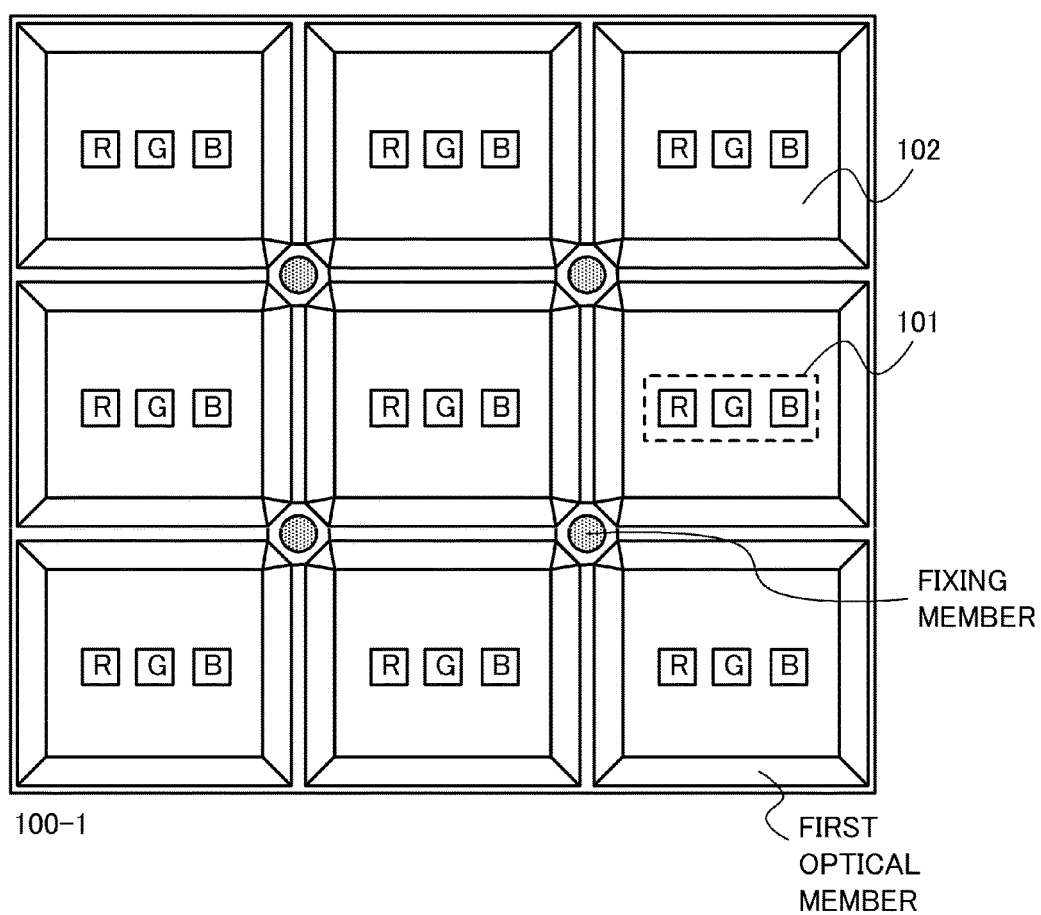
FIG. 8 is a top view showing an example of a configuration of a light-emitting unit according to a third embodiment.
Figure 9:
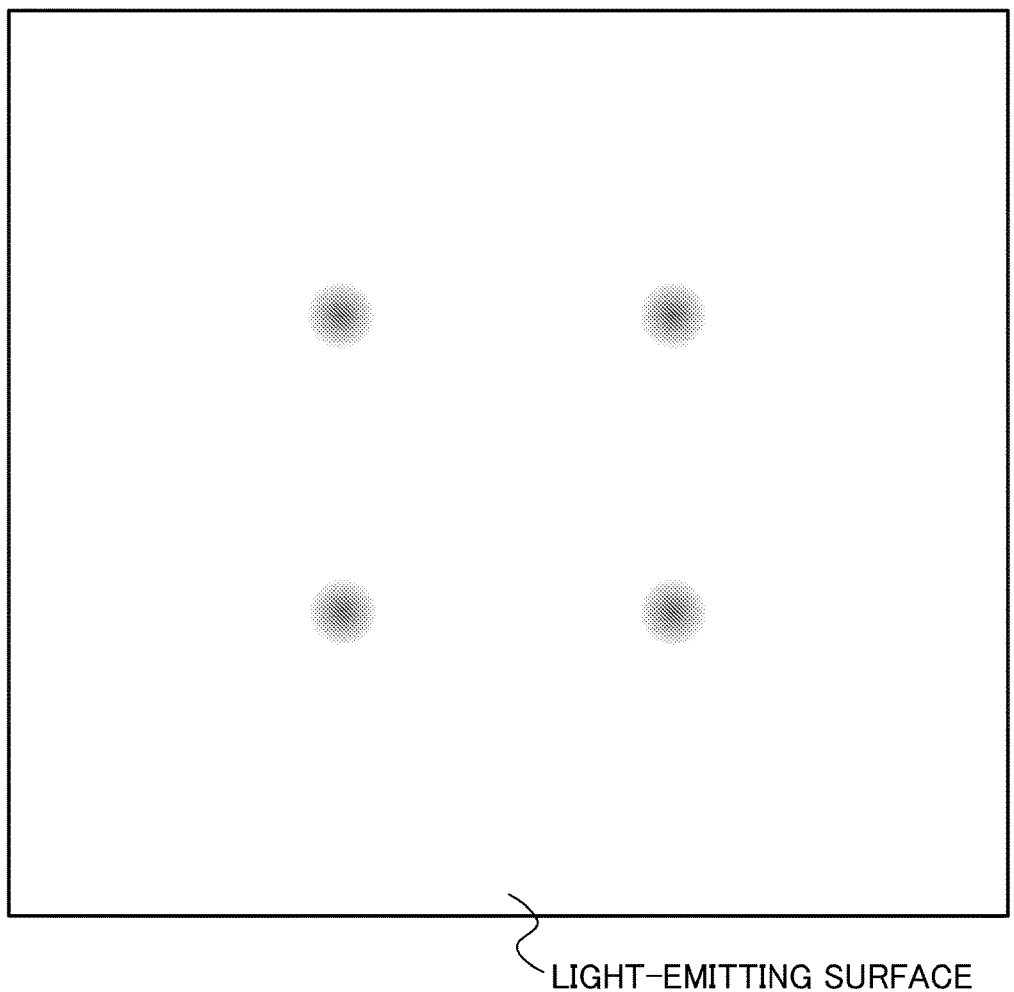
FIG. 9 is a top view showing an example of brightness unevenness which is reduced by a light-emitting unit according to the third embodiment.

FIG. 8 is a top view showing an example of a configuration of a light-emitting unit according to the present embodiment. In FIG. 8, the first optical member has been omitted. In the first and second embodiments, a fixing member protrudes toward a side of a light-emitting direction from a first optical member (FIGS. 1 and 6). In this case, a part of light emitted from each light source unit 101 and transmitted through the first optical member is reflected by the fixing member or absorbed by the fixing member. As a result, brightness unevenness or color unevenness of light emitted from the light-emitting apparatus occurs as shown in FIG. 9. For example, brightness unevenness occurs in which brightness declines at a position where the fixing member is provided. Such brightness unevenness can be reduced by increasing a distance from the first optical member to a light-emitting surface (for example, the second optical member 106). However, increasing the distance from the first optical member to the light-emitting surface results in an increase in thickness of the apparatus (the light-emitting apparatus, the image display apparatus, or the like), a decline in contrast of a display image, and the like and is therefore unfavorable.

Figure 10:
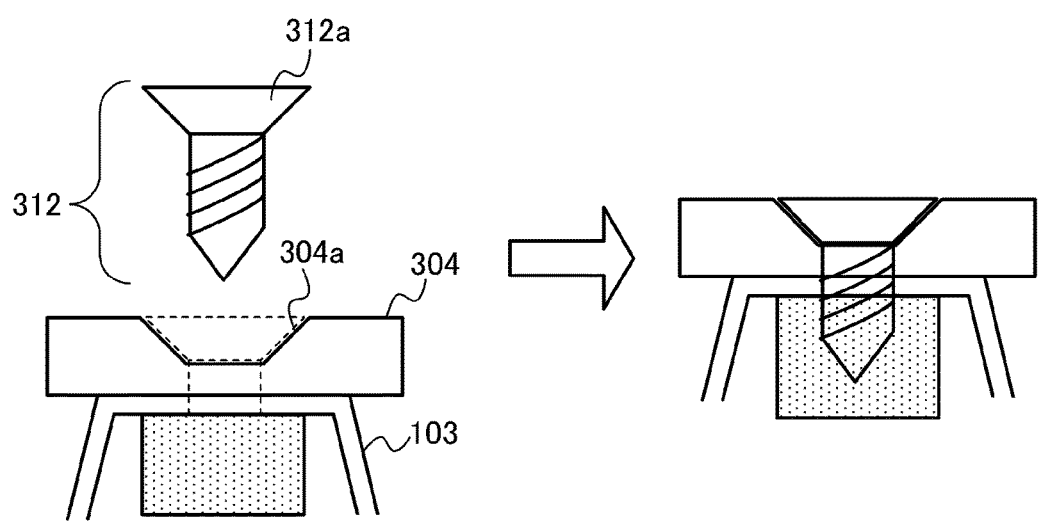
FIG. 10 is a sectional view showing an example of a configuration of a first optical member according to the third embodiment.

In consideration thereof, in the present embodiment, a structure in which the fixing member does not protrude toward a side of the light-emitting direction from the first optical member is adopted. For example, a concaved portion is formed on the first optical member so that the fixing member does not protrude from the first optical member. The concaved portion is formed at a position where the fixing member is to be provided. FIG. 10 is a sectional view showing an example of a configuration of a first optical member 304 according to the present embodiment. FIG. 10 is a sectional view at a position where the fixing member is to be provided. In the present embodiment, as shown in FIG. 10, a concaved portion 304a with a similar shape to a head portion 312a of a second member 312 is formed in a first optical member 304. Accordingly, in a case where the second member 312 is joined with the first member, the fixing member (the second member 312) no longer protrudes from the first optical member 304. As a result, brightness unevenness or color unevenness of light emitted from the light-emitting apparatus can be further reduced.

Moreover, any structure may be adopted as long as the structure prevents the fixing member from protruding toward a side of the light-emitting direction from the first optical member. For example, the fixing member may be welded to the partition member and the first optical member so that the fixing member does not protrude toward a side of the light-emitting direction from the first optical member. After the fixing member is welded to the partition member and the first optical member, a portion (a protruding portion) which protrudes toward a side of the light-emitting direction from the first optical member may be removed from the fixing member. The protruding portion may be removed by, for example, melting, polishing, cutting, or the like.

Moreover, favorably, a reflecting sheet is pasted on an upper surface (a surface on a side of the light-emitting direction) of the fixing member or a material similar to that of the first optical member (for example, resin) is used as a material of the fixing member. In addition, a countersunk head screw, a hexagon head bolt, a self-drilling tapping screw, or the like is favorably used as the second member. Accordingly, brightness unevenness or color unevenness of light emitted from the light-emitting apparatus can be further reduced. For example, by using a material similar to that of the first optical member as the material of a fixing member, since a fixing member producing similar optical performance to the first optical member can be realized, brightness unevenness or color unevenness can be further reduced.

As described above, according to the present embodiment, since the fixing member does not protrude toward a side of the light-emitting direction from the first optical member, brightness unevenness or color unevenness of light emitted from the light-emitting apparatus can be further reduced.

Fourth Embodiment

Hereinafter, a light-emitting apparatus according to a fourth embodiment of the present invention will be described. In the first, second, and third embodiments, examples have been described in which a fixing member passes through openings of a partition member and an optical member and holds both the partition member and the optical member. In the present embodiment, an example will be described in which, while a fixing member passes through an opening of a partition member and holds the partition member, an opening is not formed on an optical member and the fixing member fixes and supports the optical member from below. Moreover, same members as in the first, second, and third embodiments will be assigned same reference characters as the first embodiment and descriptions thereof will be omitted.

Figure 13A:
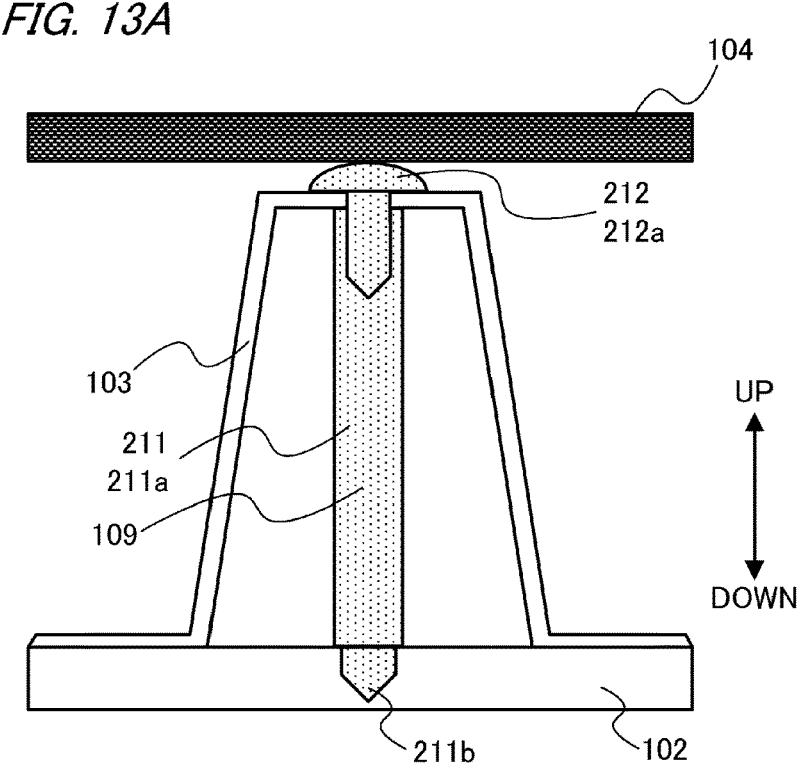
FIGS. 13A and 13B are sectional views showing an example of a configuration of a light-emitting unit according to a fourth embodiment.
Figure 13B:
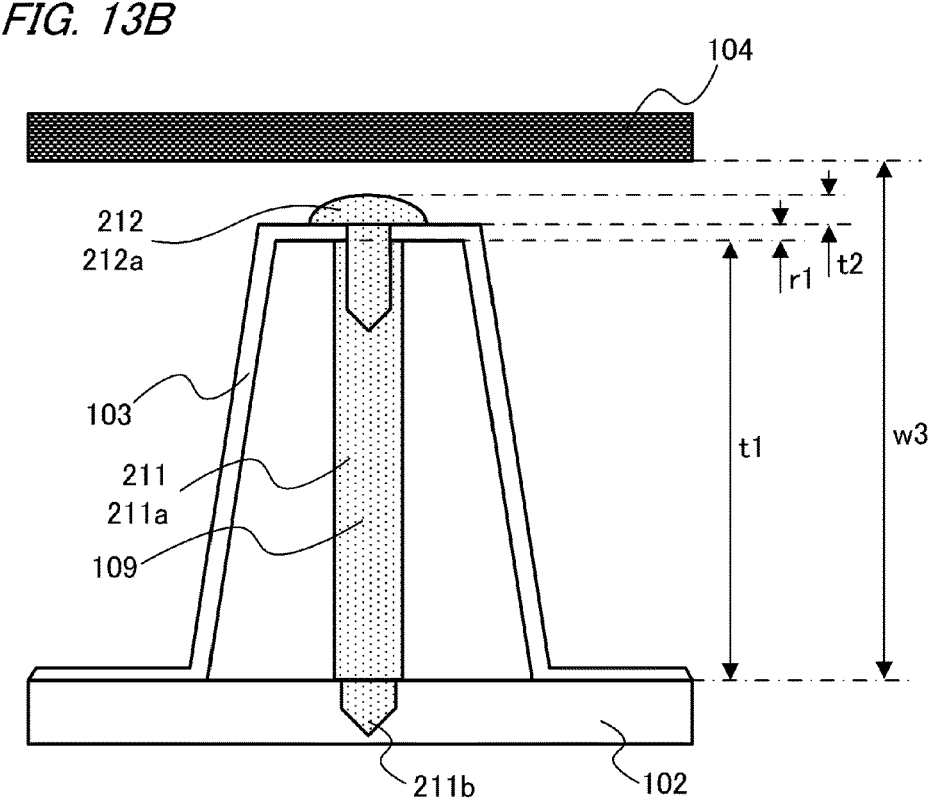

FIGS. 13A and 13B are sectional views showing an example of a configuration of a light-emitting unit according to the present embodiment. While an opening is formed in an optical member in the first, second, and third embodiments, optical members are often constituted by a resin plate and forming an opening in the resin plate requires machining. Since a scratch, an indentation, or the like attributable to machining has an adverse effect on optical characteristics, the machining must be performed so that a scratch, an indentation, or the like is not created. However, machining performed so that a scratch, an indentation, or the like is not created causes a decline in yield, an increase in cost, and the like. In addition, in a case where a plurality of fixing members are used, the plurality of fixing members restrain an optical member at a plurality of locations. Therefore, with a method of forming an opening in an optical member, fixing of the optical member by a plurality of fixing members may cause an occurrence of distortion of the optical member or may adversely affect optical characteristics unless dimensions and positions of the respective fixing members are strictly managed.

In consideration thereof, in the present embodiment, a fixing structure is adopted in which distortion of an optical member is suppressed by not forming an opening in the optical member. In FIG. 13A, an optical member 104 is placed on a head portion 212a of a second member 212 which is included in the fixing member 109. In other words, the head portion 212a of the second member 212 fixes the partition member 103 to the spacer portion 211a of the first member 211 which is included in the fixing member 109 and, at the same time, supports the optical member 104 from below. The head portion 212a fixing the optical member 104 and the head portion 212a supporting the optical member 104 from below are approximately synonymous with respect to an effect of "suppressing distortion of the partition member 103". Moreover, an up and down direction in this case are the same as an up and down direction in FIG. 13A. Therefore, "supporting the optical member 104 from below" means "supporting the optical member 104 from a side of the light source unit 101". As an installation mode of an image display apparatus, generally, horizontal installation in which the liquid crystal panel 107 faces upward or vertical installation in which the liquid crystal panel 107 faces a user is adopted. Therefore, by having the head portion 212a support the optical member 104 from a side of the light source unit 101, distortion of the partition member 103 can be sufficiently suppressed. In addition, distortion of the optical member 104 can also be sufficiently suppressed.

Obviously, the optical member 104 may be fixed to the head portion 212a by adhesion at locations where the head portion 212a and the optical member 104 come into contact with each other. As a method of adhesion, adhesion using an adhesive, bonding using an adhesive tape, or the like can be used. In such cases, the adhesive, the adhesive tape, or the like performs a role of absorbing a dimensional difference of the fixing member 109. In addition, while an example in which the fixing member 109 is constituted by a plurality of members has been described in the present embodiment, the fixing member 109 may be constituted by a single member. Furthermore, while the second member 212 has been described as a screw in the present embodiment, the second member 212 is not limited to a screw. Moreover, a shape of the head portion 212a of the screw is not limited to a spherical shape (an arc shape in a sectional view). For example, the head portion 212a may have a planar shape or other shapes.

Next, in FIG. 13B, the optical member 104 is arranged with a clearance on the head portion 212a of the second member 212 which is included in the fixing member 109. Therefore, while the head portion 212a supports the optical member 104 in close contact in FIG. 13A, the head portion 212a is arranged with a clearance below the optical member 104 in FIG. 13B. As shown in FIG. 1, the optical member 104 is held and fixed by the first holding member 105. In FIG. 13B, the optical member 104 is held while allowing deflection in an amount corresponding to the clearance. The structure shown in FIG. 13B can be described as "a configuration which suppresses an amount of deflection (by an amount corresponding to the clearance). The structure shown in FIG. 13A and the structure shown in FIG. 13B produce similar effects in terms of preventing distortion of the partition member 103.

The optical member 104 is arranged with a clearance on the head portion 212a. Therefore, a length t1 of the spacer portion 211a of the first member 211, a length (a thickness) t2 of the head portion 212a of the second member 212, a distance w3 from the upper end of the board 102 to the lower end of the optical member 104, and the thickness r1 of the partition member 103 satisfy a relationship expressed by Expression 5 below.

$$w3 > t1 + r1 + t2 \qquad \text{(Expression 5)}$$

The clearance (w3−t1+r1+t2) expressed by Expression 5 is not particularly limited. However, in order to prevent the optical member 104 from deflecting significantly in a case where some kind of an external force is applied to the optical member 104, the clearance desirably has a maximum value of around 5 mm. Whether or not the fixing member 109 is to be brought into close contact with the optical member 104, how much clearance is to be provided between the fixing member 109 and the optical member 104 in a case where such clearance is to be provided, and the like are to be determined as appropriate. For example, these determinations may be made based on a size of the screen, a size of the optical member 104, a thickness of the optical member 104, and the like. "Whether or not the fixing member 109 is to be brought into close contact with the optical member 104" may also be described as "which of the structure shown in FIG. 13A and the structure shown in FIG. 13B is to be adopted" and "a case where such clearance is to be provided between the fixing member 109 and the optical member 104" may also be described as "a case where the structure shown in FIG. 13B is adopted".

Fifth Embodiment

Hereinafter, a light-emitting apparatus according to a fifth embodiment of the present invention will be described. In the present embodiment, an arrangement and the number of fixing members 109 which enable distortion of the partition member 103 to be further suppressed and which enable flotation of the partition member 103 (a lower portion of the partition member 103) with respect to the board 102 to be further suppressed will be described.

Figure 14:
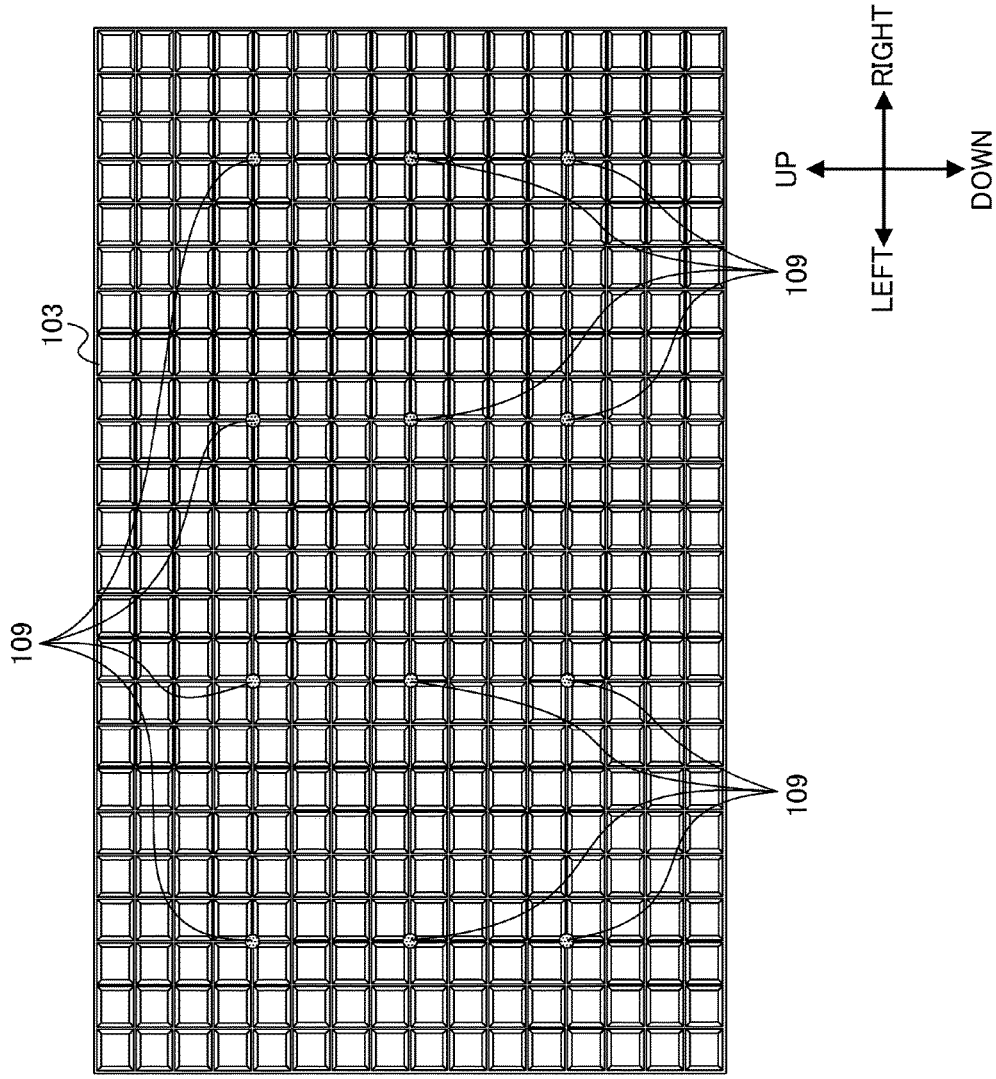
FIG. 14 is a top view showing an example of a configuration of a light-emitting unit according to a fifth embodiment.

FIG. 14 is a top view showing an example of a configuration of a light-emitting unit according to the present embodiment. In FIG. 14, in both a row direction and a column direction, a plurality of fixing members 109 are symmetrically arranged with respect to a center of the board 102 (the board 102, the partition member 103, or the optical member 104) and the plurality of fixing members 109 are arranged at equal distances. In this case, the row direction is the same as a horizontal direction (a left and right direction) in FIG. 14 and the column direction is the same as a vertical direction (an up and down direction) in FIG. 14. While in FIG. 14 the fixing members 109 are provided in central portions of light source units 101 arranged in two rows and two columns, this arrangement is not restrictive. The fixing members 109 may be provided in a boundary portion between two light source units 101 which are arranged side by side in the row direction or the column direction. Even in this case, the plurality of fixing members 109 are arranged symmetrically and at equal distances in both the row direction and the column direction.

A structure in which one fixing member 109 is arranged at a center of one partition member 103 is conceivable as an apparatus structure. However, in order to further suppress distortion of the partition member 103 and flotation between the lower portion of the partition member 103 and the board 102, favorably, four or more fixing members 109 satisfying the arrangement described above in which the fixing members 109 are arranged "symmetrically and at equal distances" are used with respect to one partition member 103. Generally, a shape of the liquid crystal panel 107 (screen) is not a square but a rectangle. Therefore, the board 102, the partition member 103, the optical member 104, and the like inevitably assume rectangular shapes (as viewed from a direction perpendicular to the screen). Accordingly, the number of the fixing members 109 in a long side direction among the row direction and the column direction is reasonably larger than the number of the fixing members 109 in a short side direction among the row direction and the column direction. The long side direction is a direction along a long side of the board 102, the partition member 103, the optical member 104, the liquid crystal panel 107, or the like and the short side direction is a direction along a short side of the board 102, the partition member 103, the optical member 104, the liquid crystal panel 107, or the like.

Furthermore, in order to further suppress distortion of the partition member 103 and flotation between the lower portion of the partition member 103 and the board 102, favorably, the plurality of fixing members 109 are arranged so as to satisfy a condition described below. In the following condition, "m" denotes the number of fixing members 109 in the row direction (horizontal direction) and "n" denotes the number of fixing members 109 in the column direction (vertical direction).

Condition: ratio (n−1):(m−1) is approximately the same as an aspect ratio of the optical member 104 (the board 102, the partition member 103, the optical member 104, or the liquid crystal panel 107).

In FIG. 14, a size of the board 102, a size of the partition member 103, a size of the optical member 104, and a size of the liquid crystal panel 107 are approximately the same and aspect ratios thereof are approximately 2:3. In addition, four fixing members 109 are arranged in the row direction and three fixing members 109 are arranged in the column direction. Therefore, (n−1):(m−1)=(3−1):(4−1)=2:3 is satisfied. Obviously, the number and the arrangement of the fixing members 109 are not limited to the above. For example, seven fixing members 109 may be arranged in the row direction and five fixing members 109 may be arranged in the column direction. Ten fixing members 109 may be arranged in the row direction and seven fixing members 109 may be arranged in the column direction. Even in these cases, (n−1):(m−1)=2:3 is satisfied. In FIG. 14, the fixing members 109 are arranged in central portions of respective regions made up of 24 light source units 101 arranged in six rows and four columns. In addition, a distance between two fixing members 109 that are adjacent to each other in the horizontal direction is larger than a distance between two fixing members 109 that are adjacent to each other in the vertical direction.

As described above, according to the present embodiment, by adopting the number and the arrangement described above as the number and the arrangement of the fixing members 109, distortion of the partition member 103 and flotation between the lower portion of the partition member 103 and the board 102 can be further suppressed.

Although preferred embodiments of the present invention have been described above, it is to be understood that the present invention is not limited to such embodiments and various modifications and changes may be implemented without departing from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158721, filed on Aug. 11, 2015, and Japanese Patent Application No. 2016-117664, filed on Jun. 14, 2016, which are hereby incorporated by reference herein in their entirety.

What is claimed is:

1. A backlight apparatus comprising:
    a board on which a plurality of light source units are arranged in a matrix pattern;
    an optical sheet configured to transmit light from the plurality of light source units;
    a partition sheet arranged between the board and the optical sheet and having a shape which encloses each of the plurality of light source units on a plane parallel to the board; and
    a plurality of fixing members fixing the optical sheet and the partition sheet, wherein
    the plurality of fixing members include a fixing member arranged in a boundary portion between two light source units that are adjacent to each other in a row direction or a column direction.

2. The backlight apparatus according to claim 1, wherein a space is formed by the board and the partition sheet in a boundary portion between two or more light source units that are adjacent to each other.

3. The backlight apparatus according to claim 1, wherein the plurality of fixing members fixes the optical sheet, the partition sheet and the board.

4. The backlight apparatus according to claim 1, wherein each of the plurality of light source units has an LED (light-emitting diode).

5. The backlight apparatus according to claim 1, wherein the partition sheet is a PET (polyethylene terephthalate) sheet.

6. The backlight apparatus according to claim 1, wherein each of the plurality of fixing members is a resin member.

7. The backlight apparatus according to claim 1, wherein each of the plurality of fixing members is not arranged in a central portion of four light source units that are adjacent to each other and which are arranged in two rows and two columns.

8. The backlight apparatus according to claim 1, wherein a thickness of the partition sheet is around 0.1 to 2 mm.

9. The backlight apparatus according to claim 1, wherein an opening is formed on the partition sheet at each of a plurality of positions where the plurality of fixing members are arranged.

10. The backlight apparatus according to claim 9, wherein an opening is formed on the optical sheet at each of a plurality of positions where the plurality of fixing members are arranged.

11. The backlight apparatus according to claim 10, wherein
    the fixing member passes through the opening of the optical sheet and the opening of the partition sheet, and fixes the optical sheet and the partition sheet.

12. The backlight apparatus according to claim 9, wherein an opening is formed on the board at each of a plurality of positions where the plurality of fixing members are arranged.

13. The backlight apparatus according to claim 12, wherein
    the fixing member passes through the opening of the partition sheet and the opening of the board, and fixes the partition sheet and the board.

14. The backlight apparatus according to claim 10, wherein
    an opening is formed on the board at each of a plurality of positions where the plurality of fixing members are arranged, and
    the fixing member passes through the opening of the optical sheet, the opening of the partition sheet and the opening of the board, and fixes the optical sheet, the partition sheet and the board.

15. The backlight apparatus according to claim 1, wherein each of the plurality of fixing members is a rivet.

16. The backlight apparatus according to claim 1, wherein a material of the optical sheet is the same as a material of the plurality of fixing members.

17. The backlight apparatus according to claim 16, wherein
    each of the material of the optical sheet and the material of the plurality of fixing members is a resin.

18. The backlight apparatus according to claim 1, wherein the board includes a circuit substrate on which a circuit is formed, a heat-dissipating substrate which releases heat to outside, and a thermally conductive sheet which is arranged between the circuit substrate and the heat-dissipating substrate and electrically insulates between the circuit substrate and the heat-dissipating substrate.

19. A liquid crystal display apparatus comprising:
    a liquid crystal panel; and
    a backlight apparatus configured to illuminate the liquid crystal panel, wherein
    the backlight apparatus is the backlight apparatus according to claim 1.

20. The liquid crystal display apparatus according to claim 19 further comprising:
    a controller configured to individually control emission brightness of the plurality of light source units.

* * * * *